J. P. HARRIS.
Meat-Cutter.

No. 161,510.

Patented March 30, 1875.

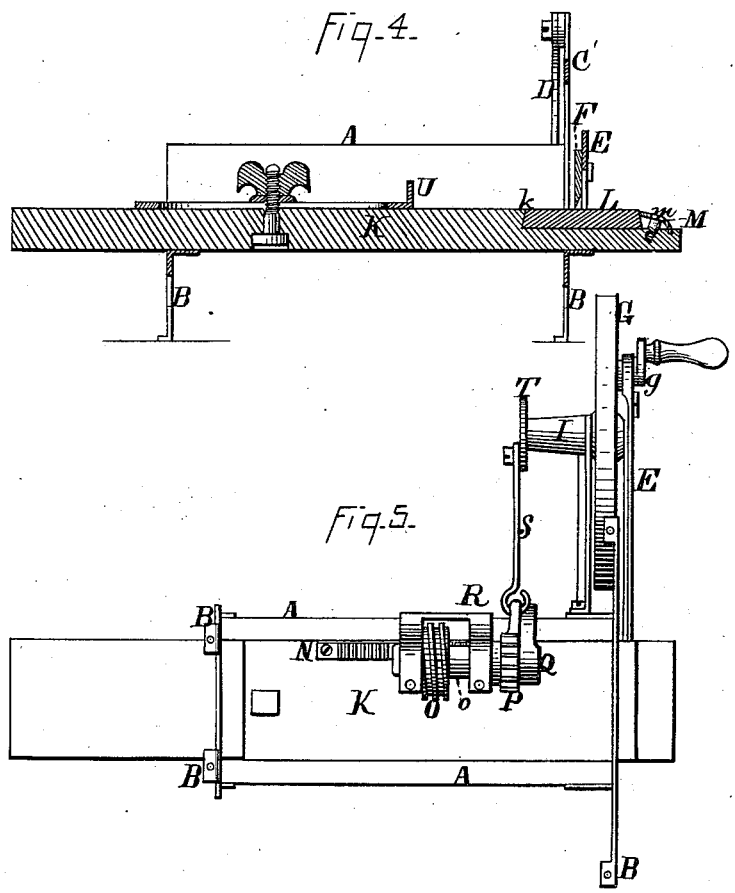

UNITED STATES PATENT OFFICE.

JOHN P. HARRIS, OF NEWBURG, NEW YORK.

IMPROVEMENT IN MEAT-CUTTERS.

Specification forming part of Letters Patent No. 161,510, dated March 30, 1875; application filed November 13, 1874.

*To all whom it may concern:*

Be it known that I, JOHN P. HARRIS, of Newburg, in the county of Orange and in the State of New York, have invented certain new and useful Improvements in Meat-Cutters; and do hereby declare that the following is a full, clear, and exact description thereof, reference being had to the accompanying drawings making a part of this specification, in which—

Figure 1:
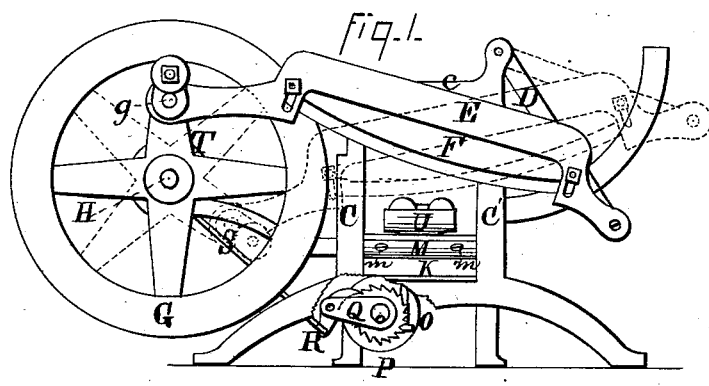
Figure 2:
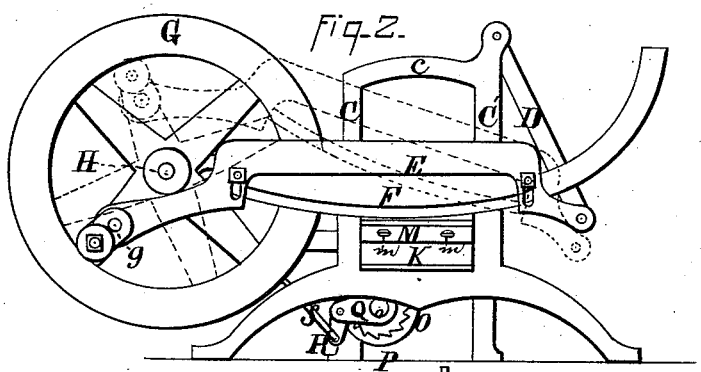
Figure 3:
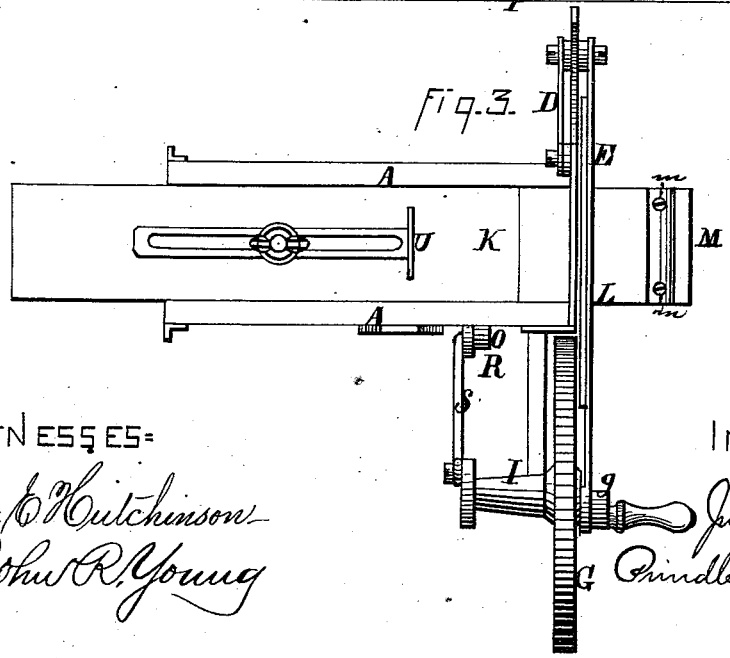

Figure 1 is a front elevation of my improved apparatus, the full lines showing the position of the cutter at the highest point of its stroke, and the dotted lines the position of said cutter at the commencement of its downward and forward motion. Fig. 2 is a like view of said apparatus, showing by the full and dotted lines two other positions of the cutter as it returns to the position first shown. Fig. 3 is a plan view of the upper side of said apparatus. Fig. 4 is a vertical central section upon a line extending from front to rear, and Fig. 5 is a plan view of the lower side of the same.

Letters of like name and kind refer to like parts in each of the figures.

The design of my invention is to enable dried meat to be sliced or shaved with ease and despatch; and it consists, principally, in the means employed for automatically moving the meat beneath the cutter, substantially as and for the purpose hereinafter shown. It consists, further, in the detachable cutter-block secured to or within the carrier, in the manner and for the purpose substantially as is hereinafter set forth.

In the annexed drawings, A and A represent two side pieces, which are connected together in parallel lines, and are supported upon suitable feet B and B, as shown. Secured to or upon the front ends of the side pieces A and A are two standards, C and C', which extend vertically upward, and at or near their upper ends are connected together by means of a cross-bar, c. Pivoted at one end to the upper end of the standard C' is a bar, D, which from thence extends downward, and has pivoted to or upon its lower end one end of a frame or holder, E, to which is attached a cutting-blade, F, by any suitable means. The opposite or free end of the cutter-frame E is journaled upon a crank-pin, g, that is secured within one side of a balance-wheel, G, which wheel is attached to the end of a shaft, H, that is journaled within a suitable bearing, I, and said bearing connected with one of the side pieces A, the arrangement being such as to cause said wheel to revolve in a plane which is in line with said cutter. As thus arranged, it will be seen that by revolving the wheel G toward the machine at each revolution the cutter will be raised to the position shown in Fig. 1, and then moved downward and toward the operator, its forward end being depressed and moved forward so as to produce a drawing cut. Within the lower portion of the space between the side pieces A and A is placed a bed-piece, K, which loosely fills the space between said parts, and rests upon the bars $b$ and $b$, which connect the same together. The forward portion of the bed-piece K is recessed or rabbeted, as shown in Fig. 4, and within such rabbet $k$ is placed a cutting-block, L, which is, preferably, somewhat higher than the upper surface of said bed-piece, and extends about two-thirds the distance between the end of the same and the inner side of said rabbet. The inner side of the rabbet $k$ is inclined downward and outward, and as the contiguous portion of the cutting-block L is correspondingly shaped said block is prevented at such side from being raised directly upward. A clamp, M, resting upon the upper side of the bed-piece and against the end of the block L, is drawn downward by means of two screws, $m$ and $m$, which pass through suitable openings in said clamp, and have their threaded ends contained within corresponding openings in said bed-piece, by which means said block is firmly secured in place longitudinally and vertically. In order that the bed-piece K may be caused to move automatically forward beneath the cutter a toothed rack, N, is attached to or upon its lower side, and caused to engage with a worm-wheel, O, that is secured upon a shaft, $o$, and said shaft journaled within suitable bearings, which are attached to one of the side pieces A. Upon the forward end of the shaft $o$ is secured a ratchet-wheel, P, and immediately outside of the latter is journaled an arm, Q, which arm has pivoted to its inner face a pawl, R, that is capable of engagement with said ratchet wheel. From the lower end of the pawl R a pivoted rod, S, extends upward and outward, and has its opposite end journaled eccentrically upon the face of a disk, T, which is secured upon and revolves with the inner end of the shaft H.

As thus arranged, each revolution of the shaft H will cause the pawl to engage with the ratchet-wheel, and at the same time will raise said pawl and the outer end of its arm Q so as to partially rotate the worm-wheel, after which said pawl will be released from engagement with said ratchet-wheel and returned to its former position, the operation described being repeated at each revolution of the driving-shaft, so as to feed forward the bed-piece and present a new portion of its load to each downward stroke of the cutter.

Meat to be sliced is placed upon the cutting-block, and held in longitudinal position upon the bed-piece by means of a stop, U, which is secured to the latter, and is capable of adjustment longitudinally upon the same.

The device thus constructed affords a simple, efficient, and easily-operated means, whereby meat may be sliced or shaved, and, from the peculiar movement of the cutter, enables meats which could not be operated upon by ordinary means to be subdivided with neatness and despatch.

Having thus fully set forth the nature and merits of my invention, what I claim as new is—

1. In combination with the reciprocating cutter F, the bed-piece K, moved longitudinally beneath the same by means of the rack N, worm-wheel O, ratchet-wheel P, pivoted arm Q, pawl R, connecting-rod S, and disk T, said parts being constructed and combined to operate substantially as and for the purpose shown.

2. In combination with the bed-piece K, provided with the rabbet k, the cutting-block L, clamp M, and screws m and m, substantially as and for the purpose set forth.

In testimony that I claim the foregoing I have hereunto set my hand this 7th day of November, 1874.

JOHN P. HARRIS.

Witnesses:
ALLEN SHAW,
NEHEMIAH FOWLER.